Sept. 22, 1925.
M. SCHWARTZ
BUSHING STRUCTURE
Filed March 21, 1925
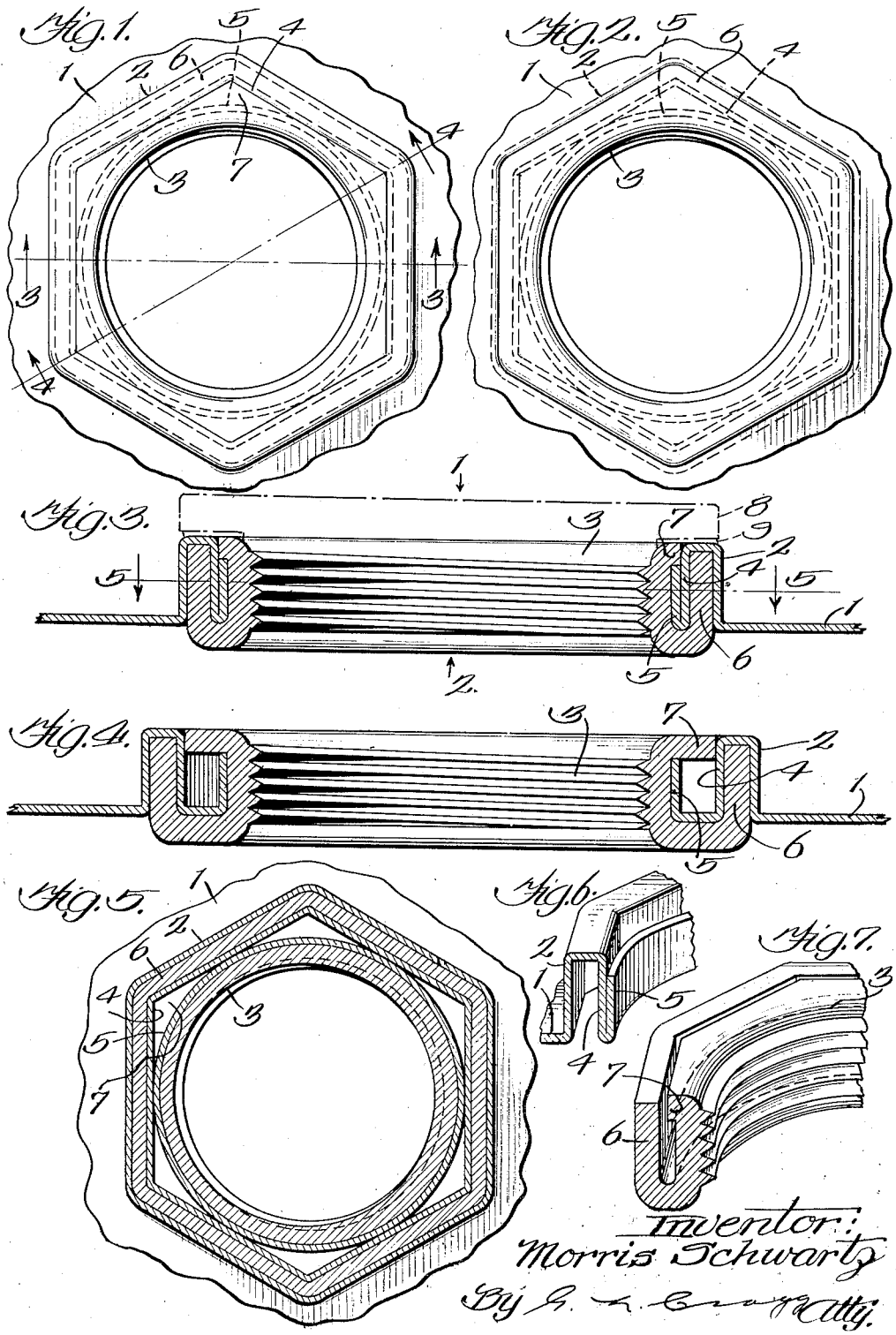
Inventor:
Morris Schwartz Patented Sept. 22, 1925.

1,554,764

UNITED STATES PATENT OFFICE.

MORRIS SCHWARTZ, OF CHICAGO, ILLINOIS, ASSIGNOR OF ONE-HALF TO WINNIFRED B. PARISH, OF CHICAGO, ILLINOIS.

BUSHING STRUCTURE.

Application filed March 21, 1925. Serial No. 17,400.

*To all whom it may concern:*

Be it known that I, MORRIS SCHWARTZ, a citizen of the United States, residing at Chicago, in the county of Cook and the State of Illinois, have invented a certain new and useful Improvement in Bushing Structures, of which the following is a full, clear, concise, and exact description.

My invention relates to bushing structures and is of particular service when employed in the construction of barrels having metallic heads or other wall portions that are to receive bungs which are inserted in the bushing structure.

In carrying out my invention the bushing that is carried by the wall of the barrel or assembled with any other body is provided with a longitudinal portion formed with a cylindrical surface and a second surface in the zone of said cylindrical surface and having portions at unequal distances from the axis of said cylindrical surface. The body that receives the bushing has a portion extending longitudinally of the bushing and formed with two surfaces in the same zone and in the zone of the aforesaid surfaces of the bushing, one of these surfaces of the body being cylindrical and conforming to and coaxial with and engaging said cylindrical surface of the bushing and the other having portions at unequal distances from the axis of said cylindrical surfaces and engaging the aforesaid second surface of the bushing.

In the preferred embodiment of the invention the portions of the bushing and the body which have parts that are at unequal distances from the axis of the cylindrical surfaces of the bushing and body are polygonal so as to engage such other around the bushing, thereby effectively preventing relative rotation of the bushing and body. The cylindrical surfaces of the bushing and body serve effectively to seal the joint between the bushing and body, a result which may be supplemented by the engaging polygonal portions of these elements.

In the most preferred embodiment of the invention the body and bushings are of U-shape where they engage each other, the U-shaped parts of these elements meshing and being provided with the inter-related cylindrical and polygonal parts.

The invention will be more fully explained in connection with the accompanying drawing in which Fig. 1 is an exterior face view of a portion of a barrel equipped with the bushing structure of my invention; Fig. 2 is an interior face view of the bushing structure; Fig. 3 is a sectional view on line 3—3 of Fig. 1, a bung being shown in dotted lines; Fig. 4 is a sectional view on line 4—4 of Fig. 1; Fig. 5 is a sectional view on line 5—5 of Fig. 3; Fig. 6 is a perspective view illustrating a part of the U-shaped formation of the body, and Fig. 7 is a perspective view illustrating a part of the U-shaped formation of the bushing.

The barrel head or other body 1 that is to be equipped with the bushing is formed with a fold 2 that is U-shaped in a section taken longitudinally of the bushing 3 assembled with the body 1. The inner side 4 of the U-shaped portion 2 is inwardly returned upon itself as indicated at 5. The bushing is of U-shape when taken in section longitudinally thereof, that is along the axis of the bushing. The outer side 6 of the bushing is inserted between the sides of the U-shaped portion 2 of the body while the inner side of the U-shaped portion of the body is received between the sides of the U-shaped portion of the bushing. The inner side of the U-shaped portion of the bushing is folded outwardly to form a flange as indicated at 7 to overlie the returned side portion 5 of the U-shaped portion of the body, this returned side portion being desirably sufficiently short to enable the portion 7 to be contained in the zone of the U-shaped portion 2. The inner side portion 4 and the outer side of the fold 2 are desirably hexagonal to furnish parts that are at unequal distances from the axis of the bushing. The returned side 5 of the U-shaped portion 2 is desirably cylindrical and coaxial with the bushing. The lateral inner and outer faces of the outer side 6 of the bushing are also desirably hexagonal and snugly engage, throughout, the lateral face portions of the U-shaped part 2 between which the bushing portion 6 is disposed. The part of the bushing immediately surrounded by the returned side 5 of the U-shaped portion 2 of the body is desirably cylindrical and closely engages said portion 5. The perimeter of the flange 7 is desirably hexagonal and snugly fits the U-side 4 of the body 1. All of the engaging lateral faces of the bushing and body are in snug contact, the engaging lateral faces of the polygonal parts preventing rotation of the bushing within the body and serving to seal the joint therebetween, the sealing function being supplemented by the engaging lateral cylindrical face of the part 5 and the cylindrical part of the bushing. As is understood, the U-shaped parts of the bushing and body have their sides extending longitudinally of the bushing mainly upon either side of the main part of the body 1, and in the case of barrel construction, are projected along the bushing outwardly of the barrel so as to receive the bung shown in dotted lines 8, the bung having a head which overlies the outer end of the bushing and the bight of the U-shaped portion 2 of the body 1. A gasket 9, also shown in dotted lines, may be interposed between the head of the bung and the adjacent parts of the bushing and body to seal the joint between the bung and the bushing and body, and also to further seal the joint between the bushing and the body. The bung is desirably threaded in the bushing, the bushing being interiorly threaded for this purpose.

Having thus described my invention, I claim:—

1. A bushing having a longitudinal portion which is U shape in a section taken longitudinally of the bushing, this portion being formed with a cylindrical surface and a second surface in the zone of the said cylindrical surface and having portions at unequal distances from the axis of said cylindrical surface, in combination with a body receiving said bushing and having a portion of U shape in a section taken longitudinally of the bushing intermeshing with the U shape portion of the bushing, this portion of the body having two surfaces in the same zone and in the zone of the aforesaid surfaces of the bushing, one of these surfaces of the body being cylindrical and conforming to and coaxial with and engaging said cylindrical surface of the bushing and the other having portions at unequal distances from the axis of said cylindrical surfaces and engaging the aforesaid second surface of the bushing.

2. A bushing having a longitudinal portion which is U shape in a section taken longitudinally of the bushing, this portion being formed with a cylindrical surface and a second surface bounding a polygon and in the zone of said cylindrical surface, in combination with a body receiving said bushing and having a portion of U shape in a section taken longitudinally of the bushing intermeshing with the U shaped portion of the bushing, this portion of the body having two surfaces in the same zone and in the zone of the aforesaid surfaces of the bushing, one of these surfaces of the body being cylindrical and conforming to and coaxial with and engaging said cylindrical surface of the bushing and the other bounding a polygon conforming to and engaging the aforesaid second surface of the bushing.

3. A bushing having a longitudinal portion which is U shape in a section taken longitudinally of the bushing, the outer side of this U shaped portion being polygonal in contour at its inner and outer lateral faces, the outer lateral face of the inner side of this portion being cylindrical, in combination with a body receiving said bushing and having a portion of U shape in a section taken longitudinally of the bushing and receiving and conforming in shape to and snugly engaging the outer side of the U shape bushing portion at both lateral faces of the latter side, the inner side of the U shaped body portion being returned upon itself and being cylindrical and in close engagement with said cylindrical face of the U shaped bushing portion.

4. A bushing having a longitudinal portion which is U shape in a section taken longitudinally of the bushing, the outer side of this U shaped portion being polygonal in contour at its inner end and outer lateral faces, the outer lateral face of the inner side of this portion being cylindrical, in combination with a body receiving said bushing and having a portion of U shape in a section taken longitudinally of the bushing, and receiving and conforming in shape to and snugly engaging the outer side of the U shape bushing portion at both lateral faces of the latter side, the inner side of the U shaped body portion being returned upon itself and being cylindrical and in close engagement with said cylindrical face of the U shaped bushing portion, the bushing portion having a flange similarly polygonal to the unreturned portion of the inner side of the U shaped body portion and snugly engaging the inner face of this unreturned portion.

In witness whereof, I hereunto subscribe my name.

MORRIS SCHWARTZ.